US012083659B2

(12) United States Patent
Bierdeman

(10) Patent No.: US 12,083,659 B2
(45) Date of Patent: Sep. 10, 2024

(54) UNBALANCED ROLLER ON LIFTING MECHANISM

(71) Applicant: MILWAUKEE ELECTRIC TOOL CORPORATION, Brookfield, WI (US)

(72) Inventor: David A. Bierdeman, New Berlin, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/085,954

(22) Filed: Dec. 21, 2022

(65) Prior Publication Data

US 2023/0202011 A1 Jun. 29, 2023

Related U.S. Application Data

(60) Provisional application No. 63/293,221, filed on Dec. 23, 2021.

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .. B25C 1/047; B25C 1/04; B25C 1/06; B25C 1/008
See application file for complete search history.

(56) References Cited

U.S. PATENT DOCUMENTS 3,847,322 A 11/1974 Smith
8,011,441 B2 9/2011 Leimbach et al.
8,011,547 B2 9/2011 Leimbach et al.
8,230,941 B2 7/2012 Leimbach et al.
8,267,296 B2 9/2012 Leimbach et al.
8,267,297 B2 9/2012 Leimbach et al.
8,286,722 B2 10/2012 Leimbach et al.
(Continued)

FOREIGN PATENT DOCUMENTS

CN 110605688 A 12/2019
DE 8711784 U1 11/1987
(Continued)

OTHER PUBLICATIONS

International Search Report and Written Opinion for Application No. PCT/US2022/053636 dated Apr. 28, 2023 (10 pages).

*Primary Examiner* — Anna K Kinsaul
*Assistant Examiner* — Veronica Martin
(74) *Attorney, Agent, or Firm* — Michael Best & Friedrich LLP

(57) ABSTRACT

A powered fastener driver includes a driver blade movable from a top-dead-center (TDC) position to a driven or bottom-dead-center (BDC) position for driving a fastener into a workpiece. The driver blade also includes a tooth defining an end portion. A drive unit provides torque to move the driver blade from the BDC position toward the TDC position. A rotary lifter is engageable with the driver blade and is configured to receive torque from the drive unit to return the driver blade from the BDC position toward the TDC position. The lifter has a drive pin and a roller positioned on and rotatable relative to the drive pin about a rotational axis. The roller includes a center of gravity that is offset from the rotational axis.

20 Claims, 11 Drawing Sheets

(56) References Cited

U.S. PATENT DOCUMENTS

| | | | |
|---|---|---|---|
| 8,387,718 | B2 | 3/2013 | Leimbach et al. |
| 8,602,282 | B2 | 12/2013 | Leimbach et al. |
| 8,763,874 | B2 | 7/2014 | McCardle et al. |
| 9,676,088 | B2 | 6/2017 | Leimbach et al. |
| 10,173,310 | B2 | 1/2019 | Wyler et al. |
| 10,478,954 | B2 | 11/2019 | Leimbach et al. |
| 10,549,412 | B2 | 2/2020 | McCardle et al. |
| 10,632,600 | B2 | 4/2020 | Pomeroy et al. |
| 10,632,601 | B2 | 4/2020 | Pomeroy et al. |
| 10,710,227 | B2 | 7/2020 | Pomeroy et al. |
| 10,730,172 | B2 | 8/2020 | Po |
| 10,744,630 | B2 | 8/2020 | Pomeroy et al. |
| 10,821,585 | B2 | 11/2020 | Kabbes et al. |
| 10,821,586 | B2 | 11/2020 | Wu et al. |
| 10,898,994 | B2 | 1/2021 | Carrier et al. |
| 10,967,491 | B2 | 4/2021 | Yasutomi et al. |
| 11,034,007 | B2 | 6/2021 | Leimbach et al. |
| 11,072,058 | B2 | 7/2021 | Wyler et al. |
| 2004/0089118 | A1 | 5/2004 | Habermehl et al. |
| 2006/0291761 | A1* | 12/2006 | Gietl .................. F16C 33/7823 384/486 |
| 2019/0126452 | A1 | 5/2019 | Po |
| 2019/0255689 | A1 | 8/2019 | Leimbach et al. |
| 2019/0375084 | A1 | 12/2019 | Bierdeman et al. |
| 2020/0055177 | A1 | 2/2020 | Scott et al. |
| 2020/0114500 | A1 | 4/2020 | Bierdeman et al. |
| 2020/0130157 | A1 | 4/2020 | Rux |
| 2020/0156228 | A1 | 5/2020 | McCardle et al. |
| 2020/0164498 | A1 | 5/2020 | Wechselberger et al. |
| 2020/0215672 | A1 | 7/2020 | Pomeroy et al. |
| 2020/0230791 | A1 | 7/2020 | Pomeroy et al. |
| 2020/0282534 | A1 | 9/2020 | Po |
| 2020/0346333 | A1 | 11/2020 | Po et al. |
| 2020/0391364 | A1 | 12/2020 | Yasutomi et al. |
| 2021/0008701 | A1 | 1/2021 | Tan et al. |
| 2021/0016424 | A1 | 1/2021 | Kabbes et al. |
| 2021/0023686 | A1 | 1/2021 | Tan et al. |
| 2021/0031347 | A1 | 2/2021 | Sato et al. |
| 2021/0138623 | A1 | 5/2021 | Bierdeman et al. |
| 2021/0205969 | A1 | 7/2021 | Zhu |
| 2021/0213595 | A1 | 7/2021 | Yasutomi et al. |
| 2021/0245344 | A1 | 8/2021 | Liu et al. |
| 2021/0291335 | A1 | 9/2021 | Liu et al. |

FOREIGN PATENT DOCUMENTS

| | | | | |
|---|---|---|---|---|
| JP | 2003165106 | A | 6/2003 | |
| WO | 2020126407 | A1 | 6/2020 | |
| WO | WO-2020252438 | A1 * | 12/2020 | ............. B25C 1/041 |

* cited by examiner

UNBALANCED ROLLER ON LIFTING MECHANISM

CROSS-REFERENCE TO RELATED APPLICATIONS

This application claims priority to U.S. Provisional Patent Application No. 63/293,221 filed on Dec. 23, 2021, the entire content of which is incorporated herein by reference.

FIELD OF THE INVENTION

The present invention relates to powered fastener drivers, and more specifically to lifter mechanisms of powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.) to drive a driver blade from a top-dead-center position to a bottom-dead-center position.

SUMMARY OF THE INVENTION

The present invention provides, in one aspect, a powered fastener driver including a driver blade movable from a top-dead-center position to a driven or a bottom-dead-center position for driving a fastener into a workpiece, the driver blade having a tooth defining an end portion, a drive unit for providing torque to move the driver blade from the bottom-dead-center position toward the top-dead-center position, and a rotary lifter engageable with the driver blade, the lifter configured to receive torque from the drive unit for returning the driver blade from the bottom-dead-center position toward the top-dead-center position. The lifter having a drive pin and a roller positioned on and rotatable relative to the drive pin about a rotational axis and the roller includes a center of gravity that is offset from the rotational axis.

The present invention provides, in another aspect, a powered fastener driver including driver blade movable from a top-dead-center position to a driven or bottom-dead-center position for driving a fastener into a workpiece, the driver blade having a tooth defining an end portion, a drive unit for providing torque to move the driver blade from the bottom-dead-center position toward the top-dead-center position; and a rotary lifter engageable with the driver blade, the lifter configured to receive torque from the drive unit for returning the driver blade from the bottom-dead-center position toward the top-dead-center position, the lifter having a drive pin rotatable relative to a body of the lifter about a rotational axis, wherein the drive pin includes a center of gravity that is offset from the rotational axis.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
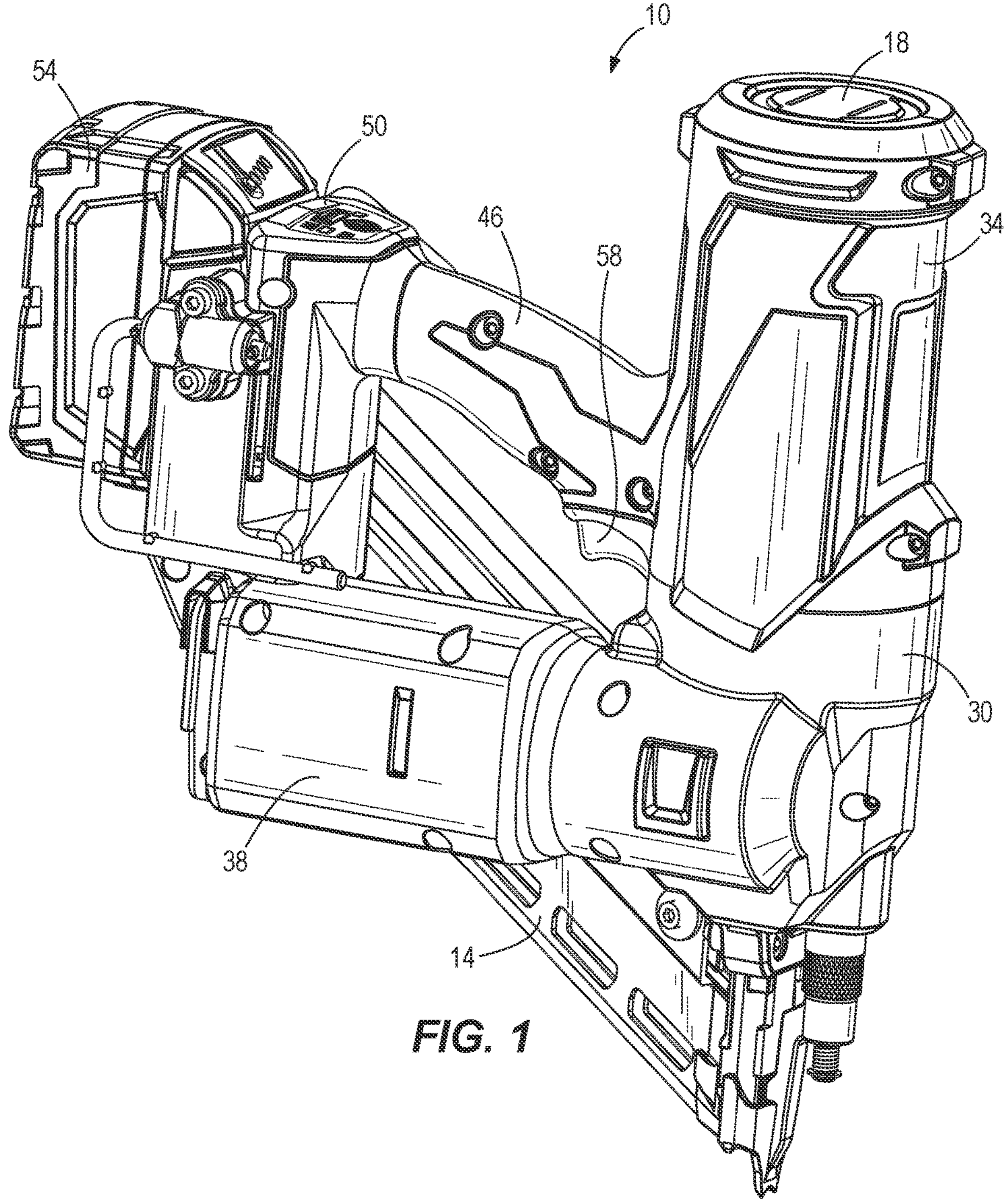
FIG. 1 is perspective view of a powered fastener driver in accordance with an embodiment of the invention.
Figure 2:
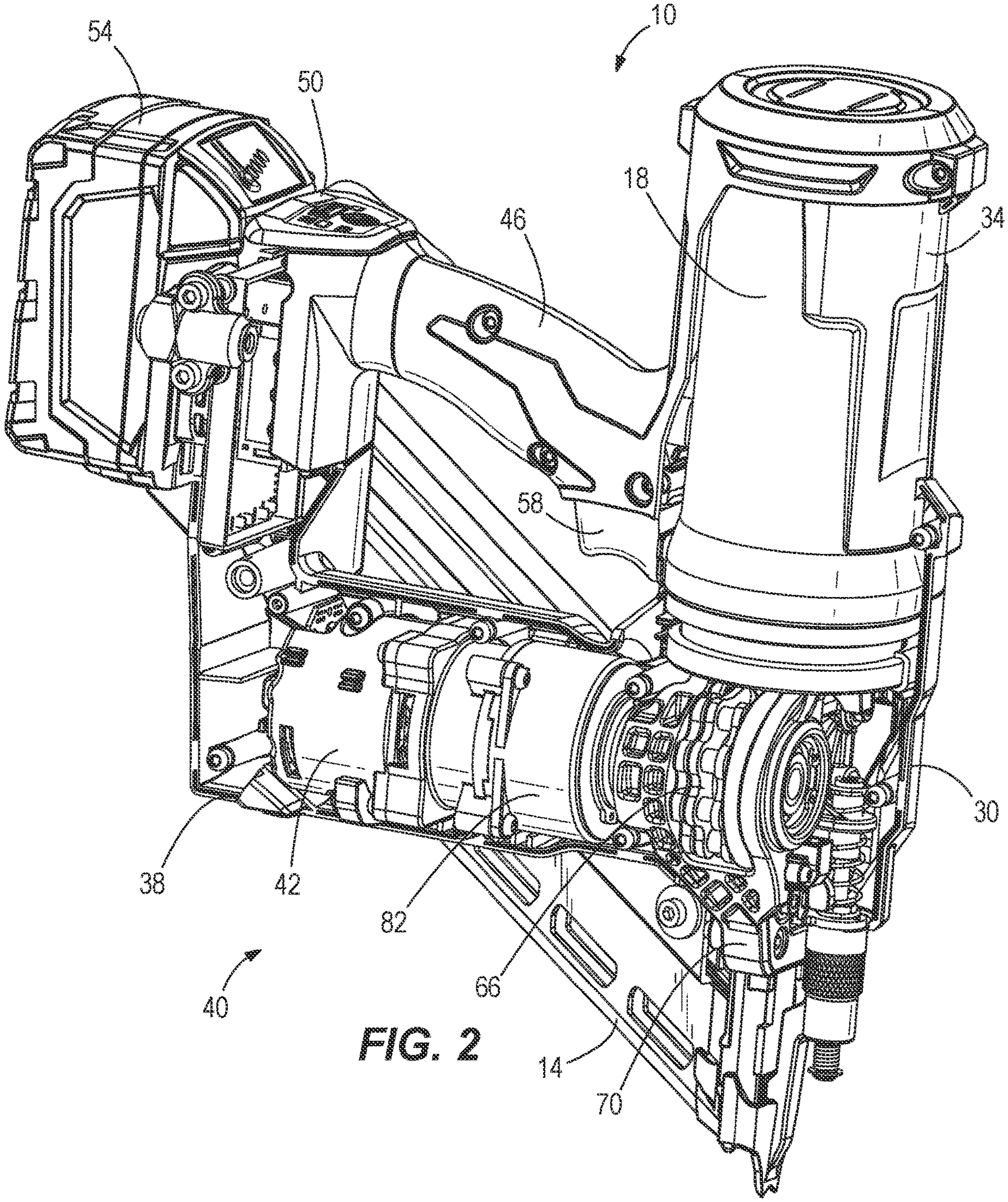
FIG. 2 is another perspective view of the powered fastener driver of FIG. 1, with portions of a housing removed to show a drive unit and a lifter assembly of the powered fastener driver of FIG. 1.
Figure 3:
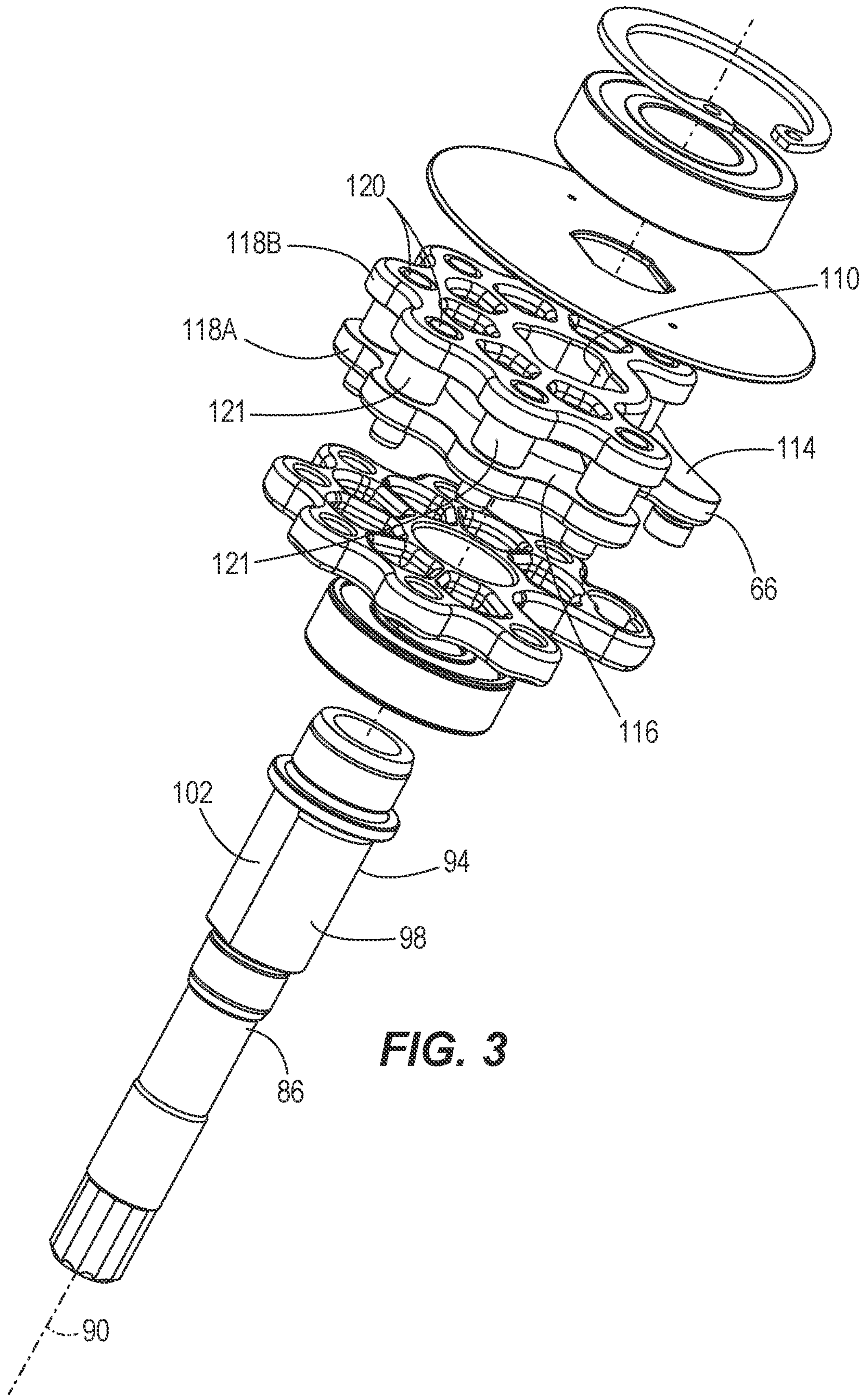
FIG. 3 is an exploded view of the lifter assembly of FIG. 2.

With reference to FIGS. 1 and 2, a gas spring-powered fastener driver 10 is operable to drive fasteners (e.g., nails, tacks, staples, etc.) held within a magazine 14 into a workpiece. The fastener driver 10 includes a cylinder 18. A moveable piston (not shown) is positioned within the cylinder 18. With reference to FIG. 3, the fastener driver 10 further includes a driver blade 26 that is attached to the piston and moveable therewith. The fastener driver 10 does not require an external source of air pressure, but rather includes pressurized gas in the cylinder 18.

With reference to FIG. 1, the fastener driver 10 includes a housing 30 having a cylinder housing portion 34 and a motor housing portion 38 extending therefrom. The cylinder housing portion 34 is configured to support the cylinder 18, whereas the motor housing portion 38 is configured to support a drive unit 40 (FIG. 2). In addition, the illustrated housing 30 includes a handle portion 46 extending from the cylinder housing portion 34, and a battery attachment portion 50 coupled to an opposite end of the handle portion 46. A battery pack 54 supplies electrical power to the drive unit 40. The handle portion 46 supports a trigger 58, which is depressed by a user to initiate a driving cycle of the fastener driver 10.

Figure 5:
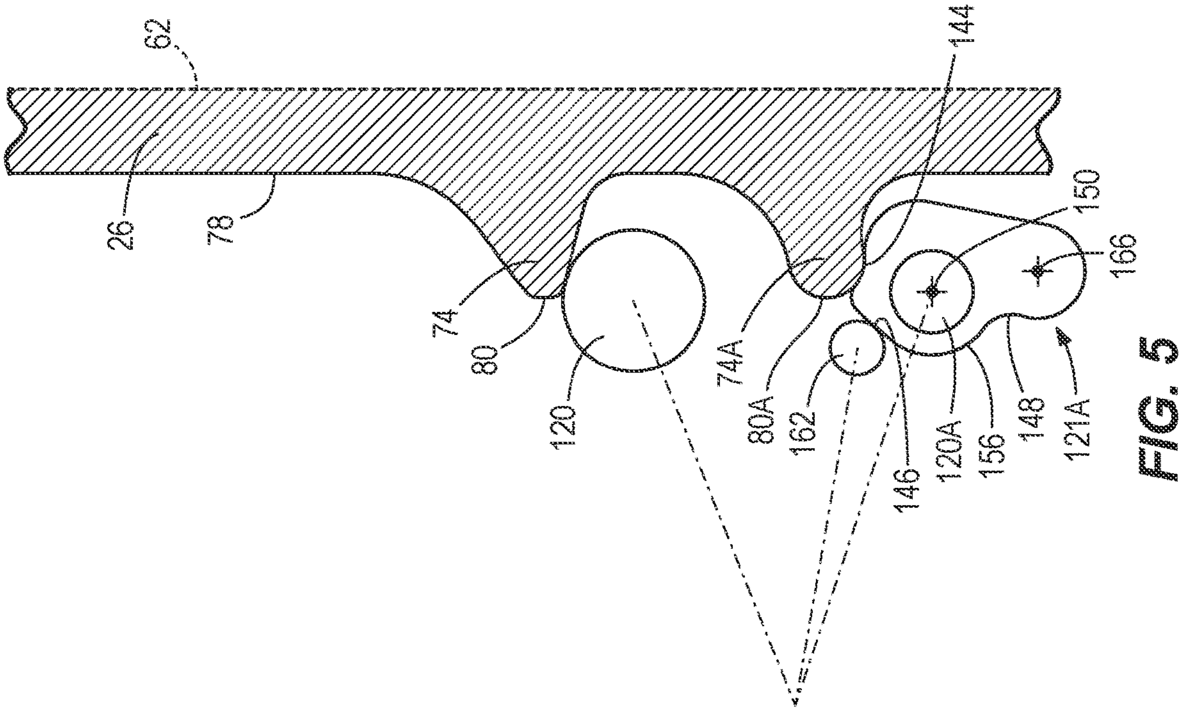
FIG. 5 is a schematic view of a portion of the lifter assembly of FIG. 2, illustrating a driver blade moving from a TDC position toward a BDC position, and a roller coupled to a last pin of the rotary lifter in a first or home position.
Figure 8:
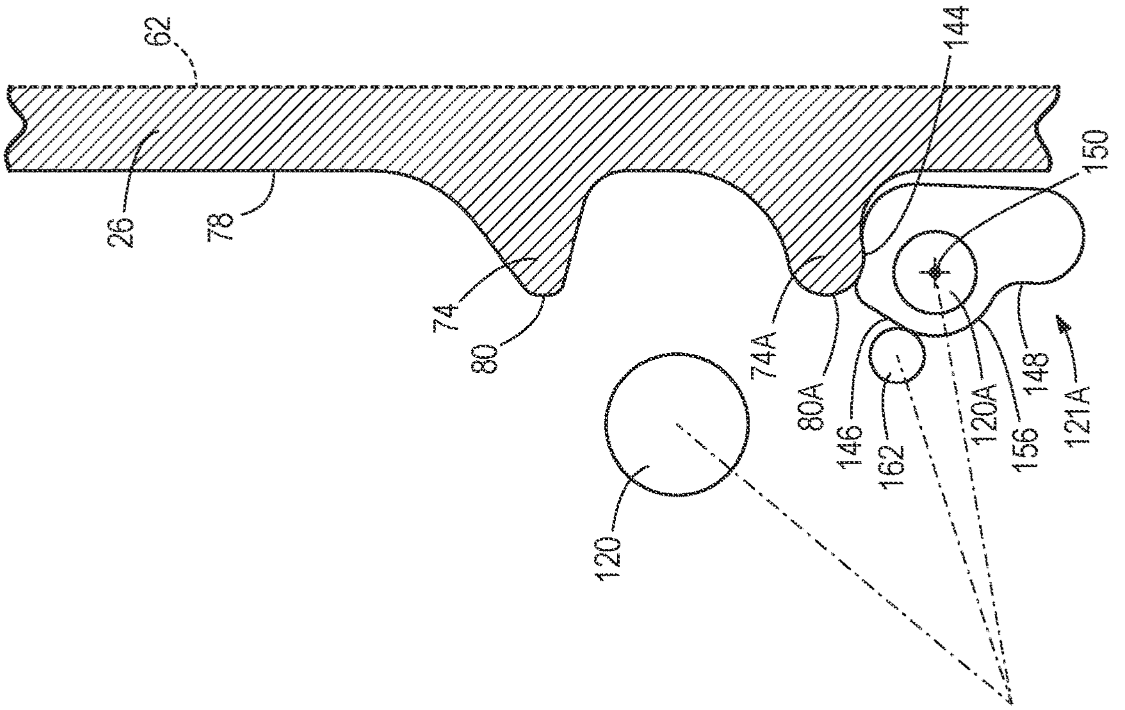
FIG. 8 is another schematic view of a portion of the lifter assembly of FIG. 2, illustrating the driver blade moving from the TDC position toward the BDC position, and the roller in a third intermediate position.

With reference to FIG. 5, the driver blade 26 defines a driving axis 62. Further, the driver blade 26 includes a plurality of lift teeth 74 formed along an edge 78 of the driver blade 26, which extends in the direction of the driving axis 62. In particular, the lift teeth 74 project laterally from the edge 78 relative to the driving axis 62. Each one of the lift teeth 74 includes an end portion 80. Each of the end portions 80, except for the end portion 80A of a lowermost tooth 74A of the driver blade 26, has the same shape. In particular, the end portion 80A of the lowermost tooth 74A has a rounded or arcuate shape, whereas the remaining lift teeth 74 include truncated ends.

During a driving cycle, the driver blade 26 and piston are moveable along the driving axis 62 between a top-dead-center (TDC) position and a bottom-dead-center (BDC) or driven position. With reference to FIGS. 2 and 3, the fastener driver 10 further includes a rotary lifter 66 that receives torque from the drive unit 40, causing the lifter 66 to rotate and return the driver blade 26 from the BDC position toward the TDC position.

With reference to FIG. 2, the powered fastener driver 10 further includes a frame 70 positioned within the housing 30. The frame 70 is configured to support the lifter 66 within the housing 30. The drive unit 40 includes an electric motor 42 and a transmission 82 positioned downstream of the motor 42. The transmission 82 includes an output shaft 86 (FIG. 3). In one embodiment, the output shaft 86 is meshed with a last stage of a gear train (e.g., multi-stage planetary gear train; not shown) of the transmission 82. Torque is transferred from the motor 42, through the transmission 82, to the output shaft 86.

With reference to FIG. 3, the output shaft 86 defines an output rotational axis 90. In addition, the output shaft 86 includes an outer peripheral surface 94 having a cylindrical portion 98 and a flat portion 102 adjacent the cylindrical portion 98. Further, in the illustrated embodiment, the outer peripheral surface 94 includes two cylindrical portions 98 and two flat portions 102. The cylindrical portions 98 are positioned opposite one another relative to the output rotational axis 90. Likewise, the flat portions 102 are positioned opposite one another relative to the output rotational axis 90. Each of the flat portions 102 is oriented parallel with the output rotational axis 90.

The lifter 66 includes an aperture 110 through which the output shaft 86 is received. The lifter 66 includes a body 114 having a hub 116 through which the aperture 110 extends, a first flange 118A radially extending from one end of the hub 116, and a second flange 118B radially extending from an opposite end of the hub 116 and spaced from the first flange 118A along the output rotational axis 90. Further, the lifter 66 includes a plurality of pins 120 extending between the flanges 118A, 118B and rollers 121 supported upon the pins 120. Each roller 121 is cylindrical and are sequentially engage the lift teeth 74 formed on the driver blade 26 as the driver blade 26 is returned from the BDC position toward the TDC position.

Figure 4:
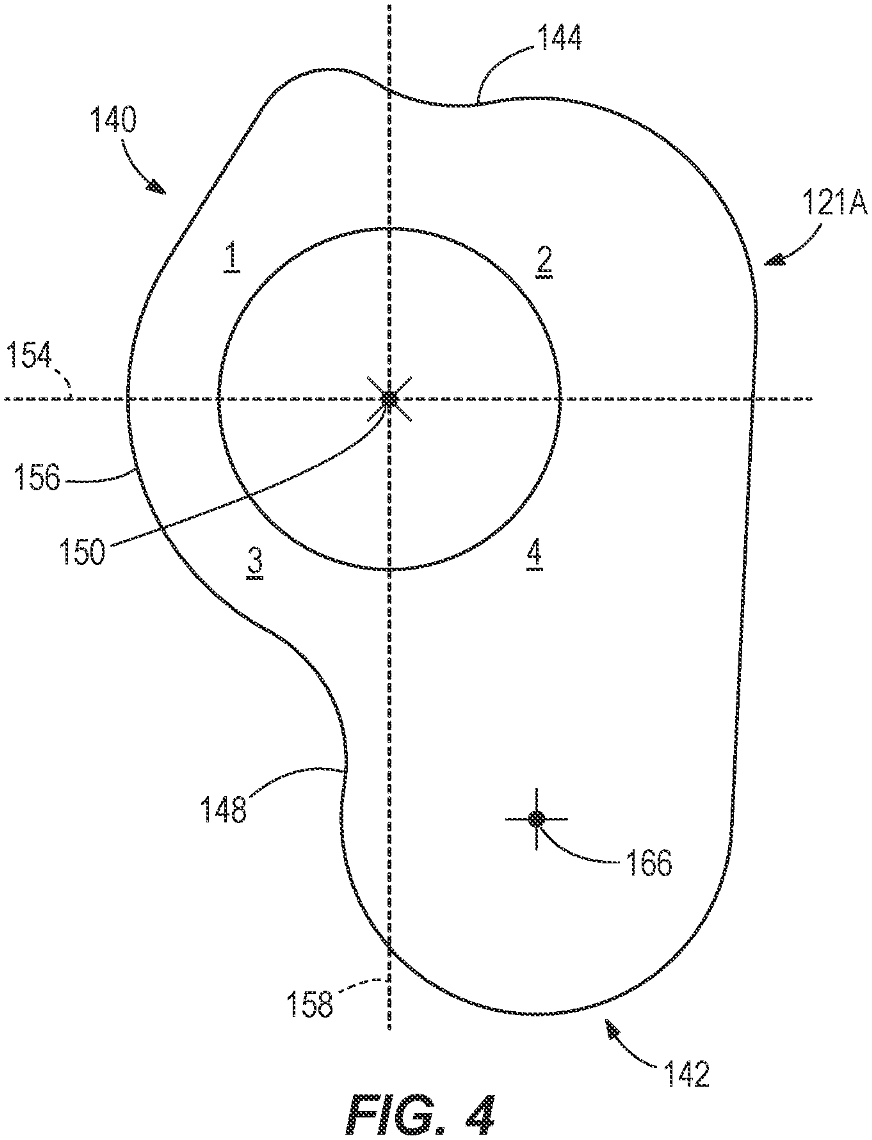
FIG. 4 is a top view of a last roller of the lifter assembly of FIG. 2.

With reference to FIGS. 4 and 5, a last lifter pin 120A of the plurality of pins 120 rotatably supports a roller 121A. In particular, the roller 121A is non-cylindrical and has an outer circumference defining a first end 140 and a second end 142 (FIG. 4) opposite the first end 140. The roller 121A further includes a first engagement section 144 and a second engagement section 146 proximate the first end 140 and a third engagement section 148 proximate the second end 142. In other words, the first and second engagement sections 144, 146 are positioned closer to the first end 140 of the roller 121A than a rotational axis 150 of the roller 121A and the third engagement section 148 is positioned closer to the second end 142 than the rotational axis 150.

Each of the first engagement section 144, the second engagement section 146, and the third engagement section 148 is defined by a concave shape. Further, a convex section 156 is positioned between the second and third engagement sections 146, 148. The first and second engagement sections 144, 146 are positioned between the first end 140 and the first axis 154 and the third engagement section 148 is positioned between the second end 142 and the rotational axis 150. In particular, a first or horizontal axis 154 and a second or vertical axis 158 (FIG. 4) extend through and are orthogonal to the rotational axis 150 when the roller 121A is in a first or home position (FIG. 5). The orthogonal axes 154, 158 further define four quadrants (FIG. 4) of the roller 121A and the roller 121A is non-symmetrical about the orthogonal axes 154, 158. For example, a first quadrant is positioned on a top-left side of the roller 121A, a second quadrant is positioned on a top-right side of the roller 121A, a third quadrant is positioned on a bottom-left side of the roller 121A, and a fourth quadrant is positioned on a bottom-right side of the roller 121A.

Further, the second engagement section 146 is positioned within the first quadrant, the first engagement section is positioned within the first and second quadrants, with a majority of the first engagement section 144 is positioned within the second quadrant, and the third engagement section 148 is positioned within the third quadrant. The first engagement section 144 is configured to slidably engage the end portion 80A of the lowermost tooth 74A during rotation of the lifter 66. In particular, the rounded shape of the end portion 80A of the lowermost tooth 74A cooperates with the concave shape of the first engagement section 144.

The lifter 66 includes a protrusion 162 (FIG. 5) located proximate the roller 121A. The protrusion 162 may extend between an inner surface of each flange 118A, 118B (FIG. 3). The second engagement section 146 of the roller 121A is configured to selectively engage the protrusion 162 such that the protrusion 162 inhibits rotation of the roller 121A about the last lifter pin 120A in a first rotational direction (e.g., in a counterclockwise direction from the frame of reference of FIG. 5) when the tooth 74A of the driver blade 26 is not in contact with the roller 121A.

With reference to FIGS. 4 and 5, a center of gravity 166 of the roller 121A is positioned within the fourth quadrant of the roller 121A (e.g., near the second end 142). In other words, the center of gravity 166 is offset from the rotational axis 150. As a result, when the roller 121A is supported upon pin 120A, the center of gravity 166 of the roller 121A imparts a counter-clockwise moment to the roller 121A about the rotational axis 150, biasing the second engagement section 146 into engagement with the protrusion 162 (e.g., which restricts or stops movement of the roller 121A in the clockwise direction). When the second engagement section 146 is in contact with the protrusion 162, the first engagement section 144 is aligned with the end portion 80A of the lowermost tooth 74A (FIG. 5). In other words, the position of the center of gravity 166 of the roller 121A urges the roller 121A towards a first or home position to facilitate meshing between the end portion 80A of the lowermost tooth 74A of the driver blade 26.

During a driving cycle in which a fastener is discharged into a workpiece, the lifter 66 returns the piston and the driver blade 26 from the BDC position toward the TDC position. As the piston and the driver blade 26 are returned toward the TDC position, the gas within the cylinder 18 above the piston is compressed. A controller of the gas-spring powered fastener driver 10 controls the drive unit 40 such that the lifter 66 stops rotation when the driver blade 26 is at an intermediate position between the BDC position and the TDC position (i.e., the ready position). In one example, the ready position may be when the piston and the driver blade 26 are near the TDC position (e.g., 80 percent of the way up the cylinder 18) such that the air within the cylinder 18 is partially compressed. The driver blade 26 and the piston are held in the ready position until released by user activation of the trigger 58 (FIG. 1), which initiates a driving cycle. The lifter 66 is rotated by the drive unit 40 until the driver blade 26 is moved to the TDC position and the last lifter roller 121A of the lifter 66 rotates past the lowermost tooth 74A of the driver blade 26 to release the driver blade 26. When released, the compressed gas above the piston within the cylinder 18 drives the piston and the driver blade 26 to the BDC position, thereby driving a fastener into a workpiece. The illustrated fastener driver 10 therefore operates on a gas spring principle utilizing the lifter 66 and the piston to compress the gas within the cylinder 18 upon being returned to the ready position for a subsequent fastener driving cycle. In other embodiments, the driver blade 26 may be held at the TDC position before a subsequent fastener driving cycle.

FIGS. 5-11 illustrate the movement of the last roller 121A during the driving cycle of the fastener driver, as the driver blade 26 is moved from the ready position toward the TDC position. When the roller 121A is urged towards the first or home position, the first engagement section 144 of the last lifter roller 121A is aligned for contact with the end portion 80A of the lowermost tooth 74A on the driver blade 26. The roller 121A is rotatable relative to the last lifter pin 120A between the first or home position (FIG. 5), in which the second engagement section 146 of the roller 121A is in engagement with the protrusion 162, and a second or release position (FIG. 11), in which the roller 121A is rotated about the pin 120A so the protrusion 162 traverses from the second engagement section 146, over the convex section 156, and into engagement with the third engagement section 148. Once the driver blade 26 is released, the center of gravity 166 of the roller 121A imparts a moment about the rotational axis 150, which urges the roller 121A in the clockwise direction so the protrusion 162 traverses from the third engagement section 148, over the convex section 156, and into engagement with the second engagement section 146. In other words, the position of the center of gravity 166 returns the roller 121A from the released position (FIG. 11) to the home position (FIG. 5).

Figure 6:
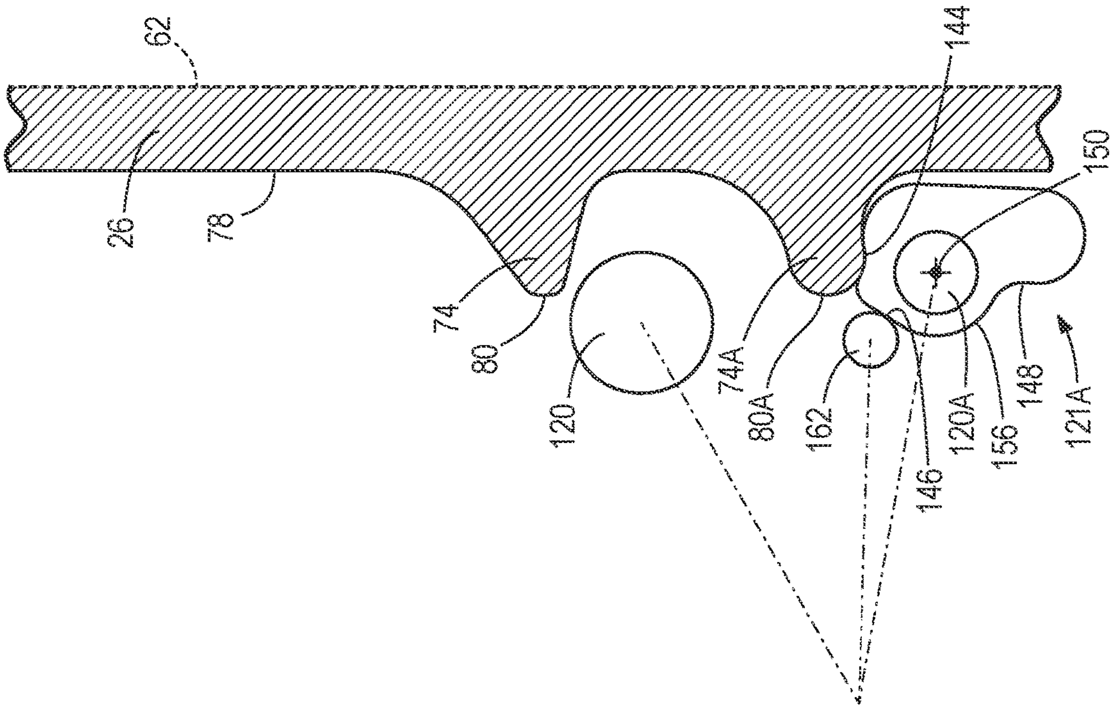
FIG. 6 is another schematic view of a portion of the lifter assembly of FIG. 2, illustrating the driver blade moving from the TDC position toward the BDC position, and the roller in a first intermediate position.
Figure 7:
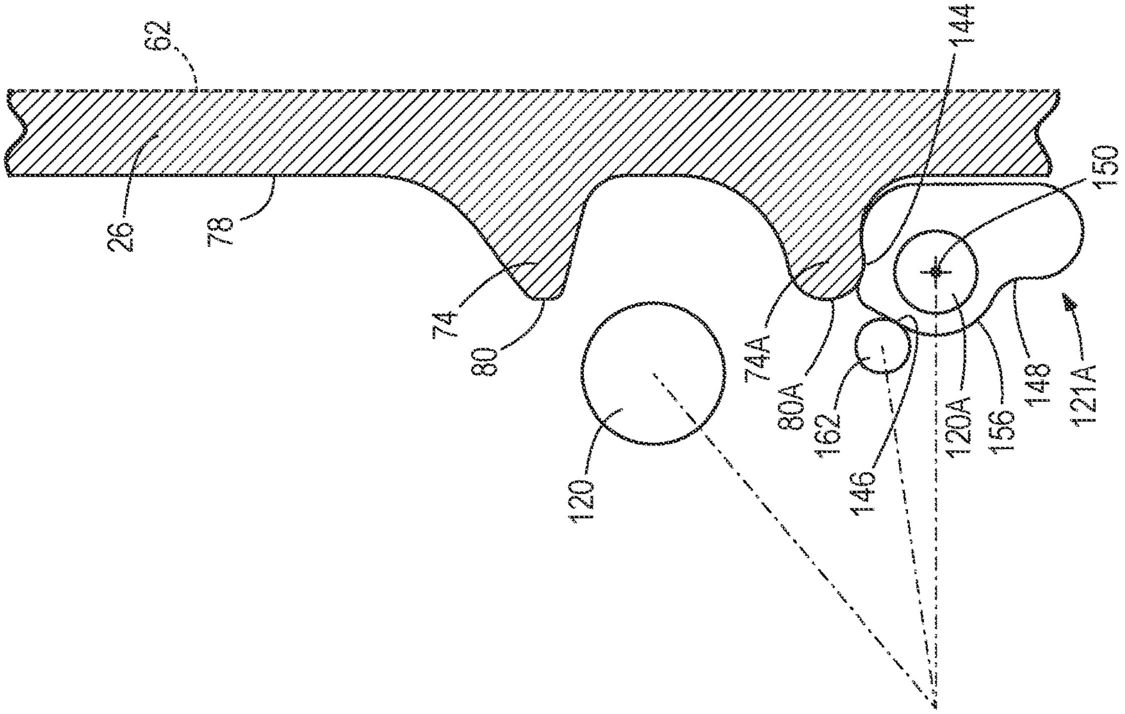
FIG. 7 is another schematic view of a portion of the lifter assembly of FIG. 2, illustrating the driver blade moving from the TDC position toward the BDC position, and the roller in a second intermediate position.
Figure 10:
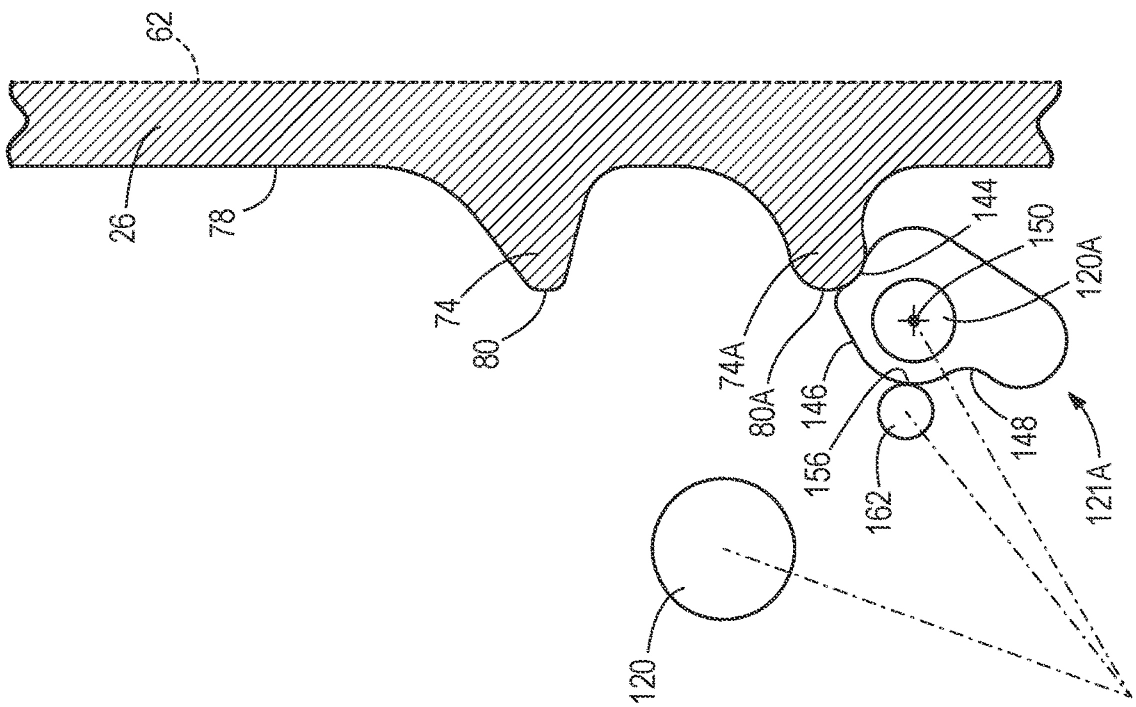
FIG. 10 is another schematic view of a portion of the lifter assembly of FIG. 2, illustrating the driver blade moving from the TDC position toward the BDC position, and the roller in a fifth intermediate position.
Figure 9:
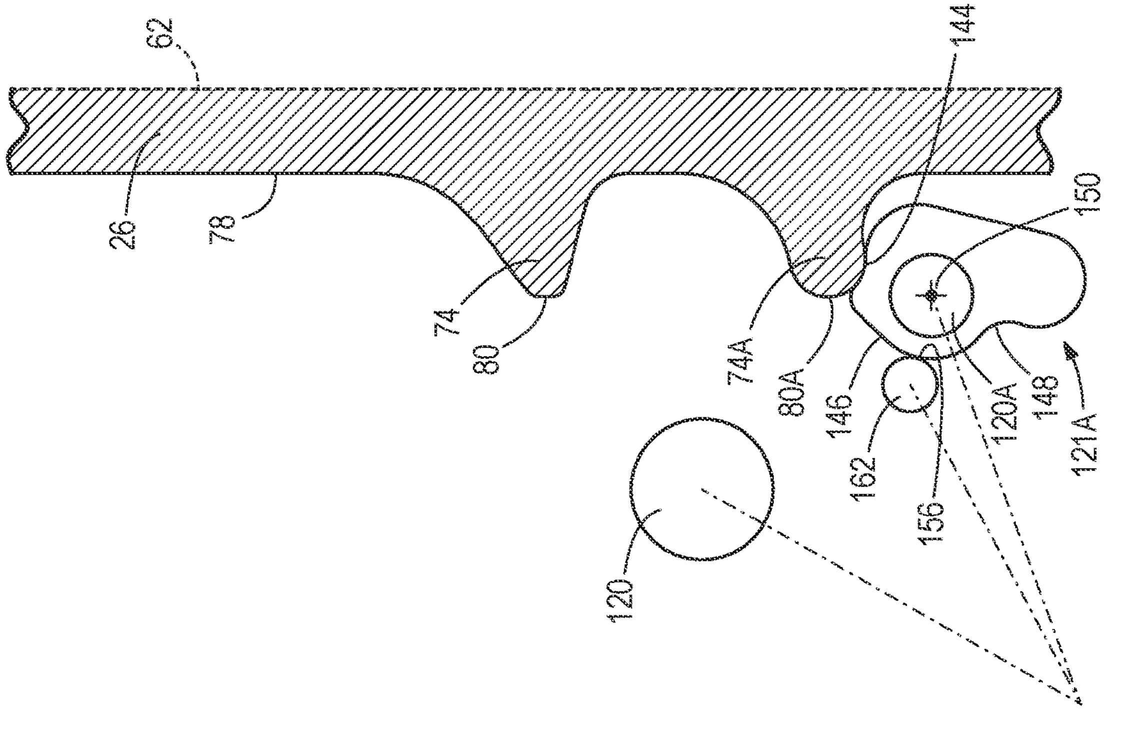
FIG. 9 is another schematic view of a portion of the lifter assembly of FIG. 2, illustrating the driver blade moving from the TDC position toward the BDC position, and the roller in a fourth intermediate position.
Figure 11:
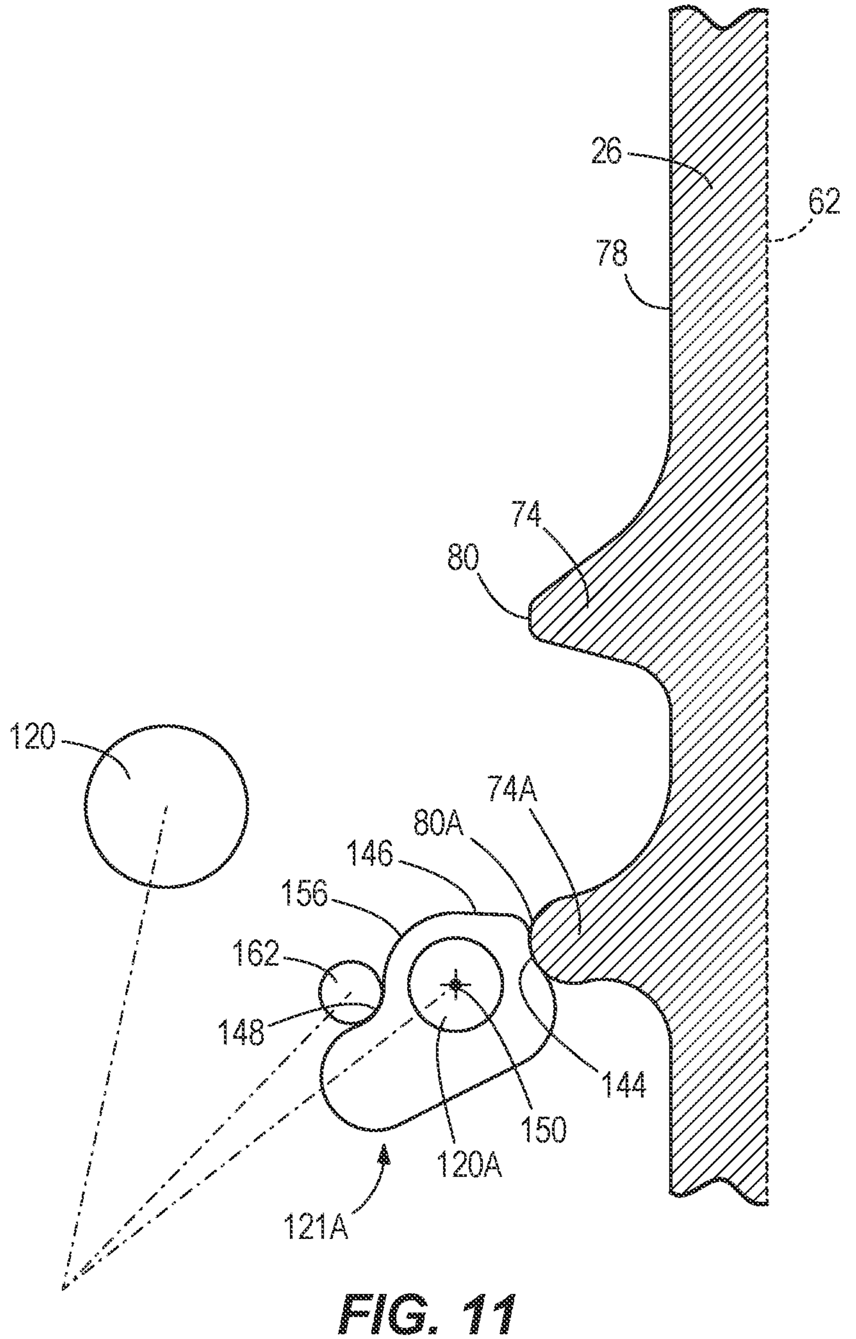
FIG. 11 is another schematic view of a portion of the lifter assembly of FIG. 2, illustrating the driver blade in the TDC position and the roller in a second or release position immediately prior to the driver blade being released to the BDC position.

FIGS. 6-10 illustrate intermediate movement of the roller 121A between the home position (FIG. 5) and the release position (FIG. 11). When the end portion 80A of the lowermost tooth 74A on the driver blade 26 first engages the roller 121A, the roller 121A rotates in a first (counter-clockwise) rotational direction, which is the same as the rotational direction of the lifter (FIGS. 6 and 7). Once the protrusion 162 rotates into engagement with the convex section 156 (FIG. 8), the roller 121A rotates in a second (clockwise) rotational direction, which is opposite the first rotational direction. As the lifter 66 continues to rotate, the protrusion 162 rotates over the convex section 156 (FIGS. 9 and 10) and into engagement with the third engagement section 148 (FIG. 11). Once the driver blade 26 is released, the driver blade 26 is moved toward the BDC position by the force of the compressed gas. Concurrently, the center of gravity 166 of the roller 121A imparts a counter-clockwise moment about the rotational axis 150 of the roller 121A to urge the roller 121A from the released position (FIG. 11) back to the home position (FIG. 5) for a subsequent driving cycle.

Figure 12:
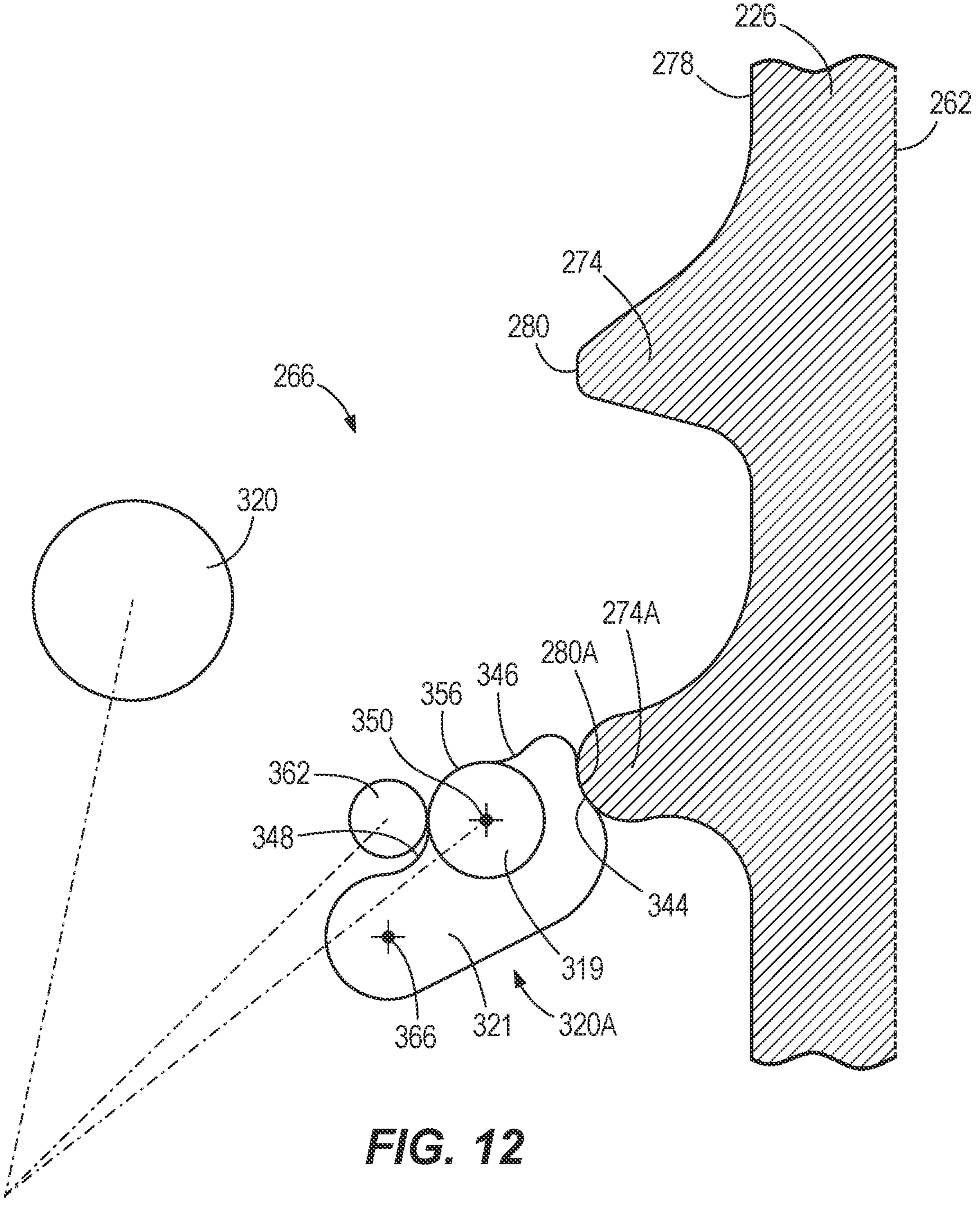
FIG. 12 is a schematic view of a portion of the lifter assembly according to another embodiment, illustrating a driver blade in a TDC position and a drive pin in a release position immediately prior to the driver blade being released to the BDC position.
Figure 13:
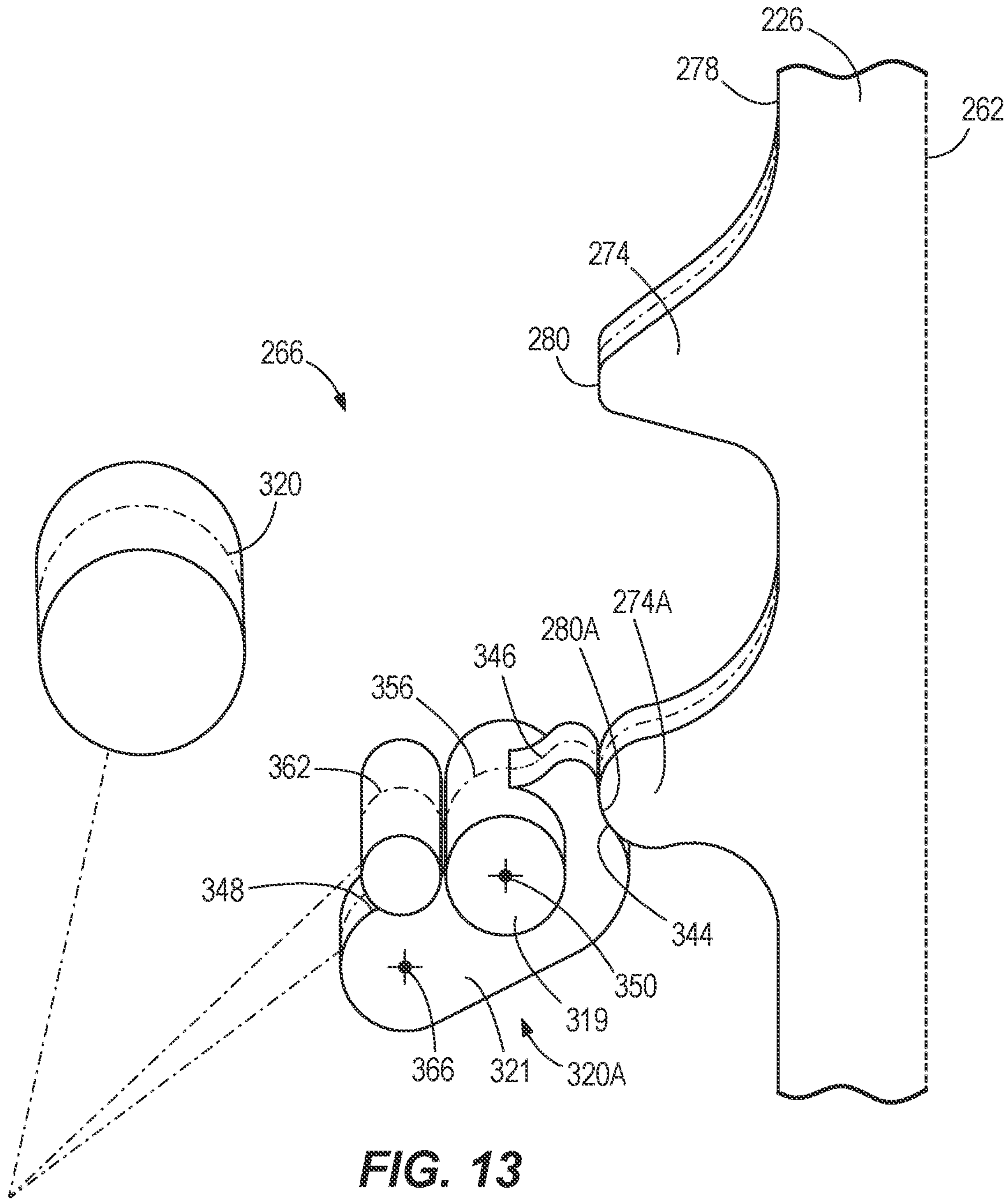
FIG. 13 is a perspective view of a portion of the lifter assembly FIG. 12, illustrating the driver blade in the TDC position and the drive pin in the release position.
Figure 14:
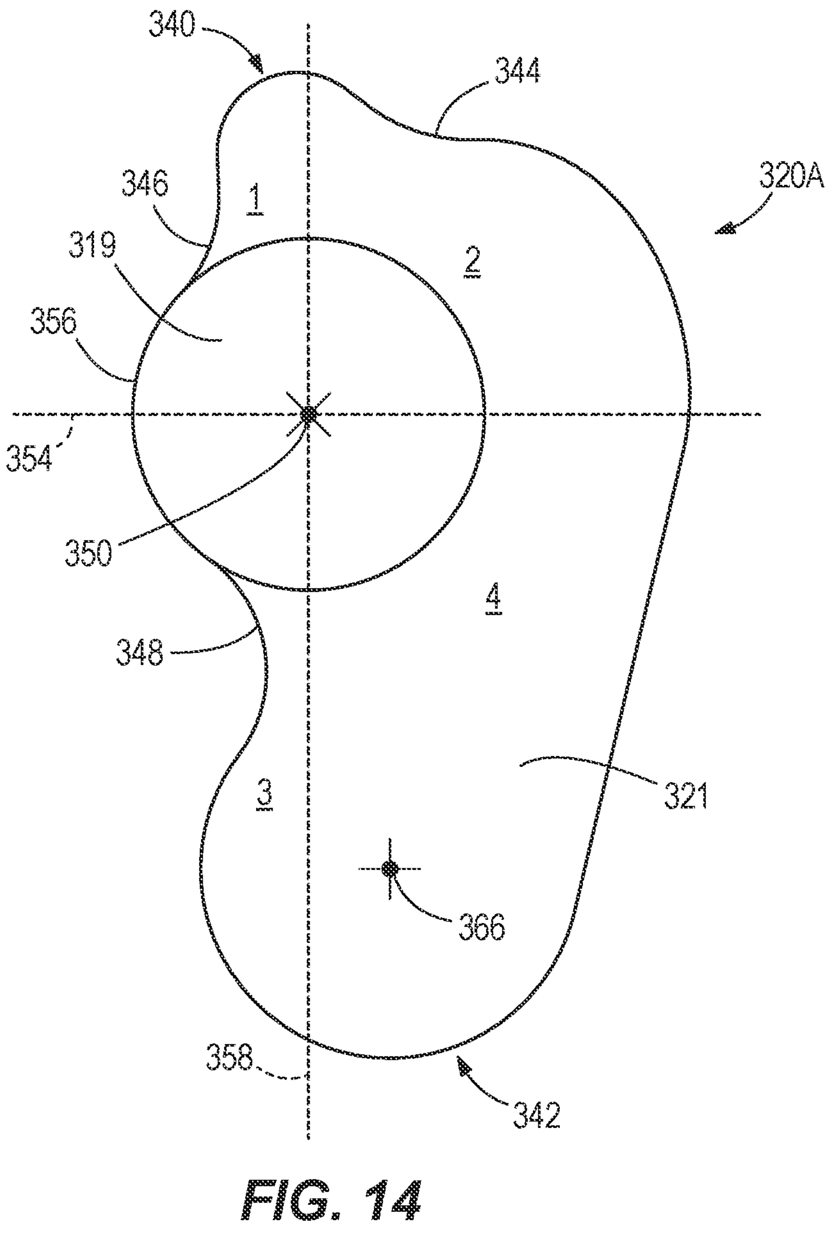
FIG. 14 is a top view of a last drive pin of the lifter assembly of FIG. 12.

The construction of the roller 121A reduces stress on the driver blade tooth 74A and the last roller 121A when holding the driver blade 26 at the ready/TDC position. In addition, the position of the center of gravity 166 is configured to position the roller 121A in the home position to facilitate re-meshing of the last blade tooth 74A and the first engagement section 144 of the roller 121A FIGS. 12-14 illustrate another embodiment of a lifter 266, with like components and features as the embodiment of the lifter 66 of the fastener driver 10 shown in FIGS. 1-11 being labeled with like reference numerals plus "200". The lifter is utilized for a fastener driver like the fastener driver 10 of FIGS. 1-11 and, accordingly, the discussion of the fastener driver 10 above similarly applies to the lifter 266 and is not re-stated. Rather, only differences between the lifter 66 of FIGS. 1-11 and the lifter 266 of FIGS. 12-13 are specifically noted herein, such as differences in a last one of the lifter pins.

The lifter 66 includes a plurality of pins 320 extending between the flanges (e.g., like the flanges 118A, 118B). The pins 320 sequentially engage the lift teeth 74 formed on the driver blade 26 as the driver blade 26 is returned from the BDC position toward the TDC position. A last lifter pin 320A of the plurality of pins 320 is rotatably supported on the lifter 266. In particular, the lifter pin 320A is non-cylindrical and has an outer circumference defining a first end 340 and a second end 342 (FIG. 14) opposite the first end 340. The pin 320A further includes a first engagement section 344 and a second engagement section 346 proximate the first end 340 and a third engagement section 348 proximate the second end 342. In other words, the first and second engagement sections 344, 346 are positioned closer to the first end 340 of the pin 320A than a rotational axis 350 of the pin 320A and the third engagement section 348 is positioned closer to the second end 342 than the rotational axis 350. Further, the pin 320A includes a first, pin portion 319 and a second, roller portion 321. In the illustrated embodiment, the first and second portions 319, 321 are integrally formed as a single, uniform piece. In other embodiments, the roller portion 321 may be coupled for co-rotation with pin portion 319 via connection feature (e.g., a key/keyway arrangement or spline, etc.).

Each of the first engagement section 344, the second engagement section 346, and the third engagement section 348 is defined by a concave shape. Further, a convex section 356 is positioned between the second and third engagement sections 346, 348. The first and second engagement sections 344, 346 are positioned between the first end 340 and the first axis 354 and the third engagement section 348 is positioned between the second end 342 and the rotational axis 350. In particular, a first or horizontal axis 354 and a second or vertical axis 358 (FIG. 14) extend through and are orthogonal to the rotational axis 350 when the last lifter pin 320A is in a first or home position. The orthogonal axes 354, 358 further define four quadrants (FIG. 14) of the last lifter pin 320A and the last lifter pin 320A is non-symmetrical about the orthogonal axes 354, 358. For example, a first quadrant is positioned on a top-left side of the last lifter pin 320A, a second quadrant is positioned on a top-right side of the last lifter pin 320A, a third quadrant is positioned on a bottom-left side of the last lifter pin 320A, and a fourth quadrant is positioned on a bottom-right side of the last lifter pin 320A.

Further, the second engagement section 346 is positioned within the first quadrant, the first engagement section 344 is positioned within the second quadrant, and the third engagement section 348 is positioned within the third quadrant. The first engagement section 344 is configured to slidably engage the end portion 280A of the lowermost tooth 274A during rotation of the lifter 266. In particular, the rounded shape of the end portion 280A of the lowermost tooth 274A cooperates with the concave shape of the first engagement section 344.

The lifter 266 includes a protrusion 362 (FIG. 12) located proximate the last lifter pin 320A. The second engagement section 346 of the last lifter pin 320A is configured to selectively engage the protrusion 362 such that the protrusion 362 inhibits rotation of last lifter pin 320A about the rotational axis 350 in a first rotational direction (e.g., in a counterclockwise direction from the frame of reference of FIG. 12) when the tooth 274A of the driver blade 226 is not in contact with the last lifter pin 320A.

With reference to FIG. 14, a center of gravity 366 of the last lifter pin 320A is positioned within the fourth quadrant of last lifter pin 320A (e.g., near the second end 342). In other words, the center of gravity 366 is offset from the rotational axis 350. As a result, the center of gravity 366 of the last lifter pin 320A imparts a counter-clockwise moment to the pin 320A about the rotational axis 350, biasing the second engagement section 346 into engagement with the protrusion 362 (e.g., which restricts or stops movement of the pin 320A in the clockwise direction). When the second engagement section 346 is in contact with the protrusion 362, the first engagement section 344 is aligned with the end portion 280A of the lowermost tooth 274A (FIG. 5). In other words, the position of the center of gravity 366 of the pin 320A urges the pin 320A towards a first or home position to facilitate meshing between the end portion 280A of the lowermost tooth 274A of the driver blade 226.

During a driving cycle in which a fastener is discharged into a workpiece, the lifter 266 returns the piston and the driver blade 226 from the BDC position toward the TDC position. In addition, the pin 320A moves in a similar fashion as the roller 121A described and show in detail in FIGS. 5-11. As such it should be appreciated that the description above applies equally to the pin 320A Although the invention has been described in detail with reference to certain preferred embodiments, variations and modifications exist within the scope and spirit of one or more independent aspects of the invention as described.

Various features of the invention are set forth in the following claims.

What is claimed is:

1. A powered fastener driver comprising:

a driver blade movable from a top-dead-center position to a driven or bottom-dead-center position for driving a fastener into a workpiece, the driver blade having a tooth defining an end portion;

a drive unit for providing torque to move the driver blade from the bottom-dead-center position toward the top-dead-center position; and a rotary lifter engageable with the driver blade, the lifter configured to receive torque from the drive unit for returning the driver blade from the bottom-dead-center position toward the top-dead-center position, the lifter having a drive pin and a roller positioned on and rotatable relative to the drive pin about a rotational axis, wherein the roller includes a center of gravity that is offset from the rotational axis, and wherein the center of gravity is configured to impart a counter-clockwise moment on the roller such that the roller returns to a first position from a second position.

2. The powered fastener driver of claim 1, wherein the roller has a pair of orthogonal axes that intersect the rotational axis, and wherein the orthogonal axes define four quadrants of the roller.

3. The powered fastener driver of claim 2, wherein the roller is non-symmetrical about the orthogonal axes.

4. The powered fastener driver of claim 2, wherein a first quadrant is positioned on a top-left side of the roller, a second quadrant is positioned on a top-right side of the roller, a third quadrant is positioned on a bottom-left side of the roller, and a fourth quadrant is positioned on a bottom-right side of the roller.

5. The powered fastener driver of claim 4, wherein the center of gravity is positioned within the fourth quadrant.

6. The powered fastener driver of claim 4, wherein the roller has a first engagement section configured to engage the end portion of the tooth of the driver blade when moving the driver blade from the bottom-dead-center position toward the top-dead-center position and a second engagement section configured to engage a protrusion of the lifter to restrict movement of the roller, and the center of gravity of the roller is configured to impart the counter-clockwise moment about the rotational axis of the roller to urge the roller towards the first position where the second engagement section engages the protrusion to align the first engagement section with the end portion of the tooth of the driver blade.

7. The powered fastener driver of claim 6, wherein the roller further includes a third engagement section, and wherein each engagement section is defined by a concave shape.

8. The powered fastener driver of claim 7, wherein the roller is rotatable relative to the drive pin between the first position and the second position where the protrusion is in engagement with the third engagement section.

9. The powered fastener driver of claim 7, wherein the second engagement section is positioned within the first quadrant, a majority of the first engagement section is positioned within the second quadrant, and the third engagement section is positioned within the third quadrant.

10. A powered fastener driver comprising:

a driver blade movable from a top-dead-center position to a driven or bottom-dead-center position for driving a fastener into a workpiece, the driver blade having a tooth defining an end portion;

a drive unit for providing torque to move the driver blade from the bottom-dead-center position toward the top-dead-center position; and a rotary lifter engageable with the driver blade, the lifter configured to receive torque from the drive unit for returning the driver blade from the bottom-dead-center position toward the top-dead-center position, the lifter having a drive pin rotatable relative to a body of the lifter about a rotational axis, wherein the drive pin includes a center of gravity that is offset from the rotational axis, and wherein the center of gravity is configured to impart a counter-clockwise moment on the drive pin such that the drive pin returns to a first position from a second position.

11. The powered fastener driver of claim 10, wherein the drive pin has a pair of orthogonal axes that intersect the rotational axis, and wherein the orthogonal axes define four quadrants of the drive pin.

12. The powered fastener driver of claim 11, wherein the drive pin is non-symmetrical about the orthogonal axes.

13. The powered fastener driver of claim 11, wherein a first quadrant is positioned on a top-left side of the drive pin, a second quadrant is positioned on a top-right side of the drive pin, a third quadrant is positioned on a bottom-left side of the drive pin, and a fourth quadrant is positioned on a bottom-right side of the drive pin.

14. The powered fastener driver of claim 13, wherein the center of gravity is positioned within the fourth quadrant.

15. The powered fastener driver of claim 13, wherein the drive pin has a first engagement section configured to engage the end portion of the tooth of the driver blade when moving the driver blade from the bottom-dead-center position toward the top-dead-center position and a second engagement section configured to engage a protrusion of the lifter to restrict movement of the drive pin, and the center of gravity of the drive pin is configured to impart the counter-clockwise moment about the rotational axis of the drive pin to urge the drive pin towards the first position where the second engagement section engages the protrusion to align the first engagement section with the end portion of the tooth of the driver blade.

16. The powered fastener driver of claim 15, wherein the drive pin further includes a third engagement section, and wherein each engagement section is defined by a concave shape.

17. The powered fastener driver of claim 16, wherein the drive pin is rotatable relative to the body of the lifter between the first position and the second position where the protrusion is in engagement with the third engagement section.

18. The powered fastener driver of claim 16, wherein the second engagement section is positioned within the first quadrant, the first engagement section is positioned within the second quadrant, and the third engagement section is positioned within the third quadrant.

19. The powered fastener driver of claim 10, wherein the drive pin has a pin portion and a roller portion.

20. The powered fastener driver of claim 19, wherein the pin portion and the roller portion are integrally formed as a single, uniform piece.

* * * * *